(12) United States Patent
Kufner

(10) Patent No.: US 8,720,431 B2
(45) Date of Patent: May 13, 2014

(54) MOUNTING FRAME FOR SUPPORTING SHEET-TYPE SOLAR PANELS

(75) Inventor: Johann Kufner, Aholming (DE)

(73) Assignee: Ideematec Deutschland GmbH, Wallerfing (DE)

( * ) Notice: Subject to any disclaimer, the term of this patent is extended or adjusted under 35 U.S.C. 154(b) by 1469 days.

(21) Appl. No.: 12/156,885

(22) Filed: Jun. 5, 2008

(65) Prior Publication Data
US 2009/0320826 A1    Dec. 31, 2009

(30) Foreign Application Priority Data

Jun. 6, 2007    (DE) .................... 20 2007 007 970 U

(51) Int. Cl.
*F24J 2/46*    (2006.01)
(52) U.S. Cl.
USPC ........................................ 126/571; 126/569
(58) Field of Classification Search
USPC .................. 126/571, 569, 573, 600, 696, 701
See application file for complete search history.

(56) References Cited

U.S. PATENT DOCUMENTS

| | | | | |
|---|---|---|---|---|
| 2,534,710 A * | 12/1950 | Golian et al. | ................... | 441/20 |
| 3,286,270 A * | 11/1966 | Kelly | ............................ | 343/915 |
| 3,707,720 A * | 12/1972 | Staehlin et al. | ................ | 343/755 |
| 3,872,854 A * | 3/1975 | Raser | ............................ | 126/606 |
| 4,011,881 A * | 3/1977 | Becher | .......................... | 135/20.3 |
| 4,129,360 A * | 12/1978 | Deflandre et al. | ............ | 359/853 |
| 4,156,997 A * | 6/1979 | Decker et al. | ................ | 52/223.6 |
| 4,276,872 A * | 7/1981 | Blake et al. | .................... | 126/578 |
| 4,365,618 A * | 12/1982 | Jones | ............................ | 126/576 |
| 4,491,388 A * | 1/1985 | Wood | ............................. | 359/853 |
| 4,558,551 A | 12/1985 | Sevelinge et al. | | |
| 5,058,565 A * | 10/1991 | Gee et al. | ....................... | 126/570 |
| 5,798,517 A * | 8/1998 | Berger | ......................... | 250/203.4 |
| 6,123,067 A | 9/2000 | Warrick | | |
| 6,340,956 B1 * | 1/2002 | Bowen et al. | ................. | 343/915 |
| 6,485,152 B2 * | 11/2002 | Wood | ............................. | 359/853 |
| 6,543,464 B1 * | 4/2003 | Grady, II | .......................... | 135/22 |
| 6,566,834 B1 * | 5/2003 | Albus et al. | ................ | 318/568.2 |
| 6,662,801 B2 * | 12/2003 | Hayden et al. | ................ | 126/571 |
| 7,172,385 B2 * | 2/2007 | Khajepour et al. | ............ | 414/735 |
| 7,357,132 B2 * | 4/2008 | Hayden | .......................... | 126/604 |
| 8,237,098 B2 * | 8/2012 | Cabanillas Saldana | ... | 250/203.4 |

(Continued)

FOREIGN PATENT DOCUMENTS

| | | | | |
|---|---|---|---|---|
| CN | WO 2007/147293 A1 * | 12/2007 | ............. | A45B 25/14 |
| DE | 2740431 | 3/1979 | | |

(Continued)

OTHER PUBLICATIONS

"Machine Translation of DE 8520407U1 published Sep. 26, 1985", 5 pgs.

*Primary Examiner* — Steven B McAllister
*Assistant Examiner* — Desmond C Peyton
(74) *Attorney, Agent, or Firm* — Benjamin C. Armitage; Billion & Armitage

(57) ABSTRACT

The invention relates to a mounting frame for supporting sheet-type solar panels (12) comprising, fitted substantially vertically for anchoring by its lower end (13a) in the ground or by a fixed anchoring location (13b), a supporting mast (13) at which the solar panels (12) resting on a plane panel support (8-11) are supported by means of a supporting structure (14) and which are rotatable about the axis of the mast for azimuthal tracking.

18 Claims, 11 Drawing Sheets

(56) References Cited

U.S. PATENT DOCUMENTS

| | | | |
|---|---|---|---|
| 2002/0023638 A1* | 2/2002 | Buron et al. | 126/601 |
| 2003/0062037 A1* | 4/2003 | Hayden et al. | 126/570 |
| 2006/0054162 A1 | 3/2006 | Romeo | |
| 2006/0096586 A1* | 5/2006 | Hayden | 126/600 |
| 2008/0066392 A1* | 3/2008 | Sorensen | 52/79.5 |
| 2009/0014054 A1* | 1/2009 | Cano Messeguer et al. | 136/246 |
| 2009/0107484 A1* | 4/2009 | Bender | 126/569 |
| 2010/0059045 A1* | 3/2010 | Guinea Diaz et al. | 126/601 |
| 2010/0101559 A1* | 4/2010 | Grant et al. | 126/600 |

FOREIGN PATENT DOCUMENTS

| | | | | |
|---|---|---|---|---|
| DE | 3236506 A1 | 3/1984 | | |
| DE | 8520407 U1 | 9/1985 | | |
| DE | 9408865 | 7/1994 | | |
| DE | 4309259 | 9/1994 | | |
| DE | 9405983 | 8/1995 | | |
| DE | 4443834 A1 | 6/1996 | | |
| DE | 20017249 | 3/2001 | | |
| DE | 10022236 | 11/2001 | | |
| DE | 102005013334 A1 | 9/2006 | | |
| EP | 1 626 140 A2 * | 2/2006 | | E04H 6/02 |
| EP | 1626140 A2 | 2/2006 | | |
| EP | 1632786 A1 | 3/2006 | | |
| FR | 2532727 A1 | 3/1984 | | |
| JP | 56155343 A * | 12/1981 | | F24J 3/02 |
| WO | WO 9300840 A1 * | 1/1993 | | A45B 3/00 |
| WO | WO-2004/044501 A1 | 5/2004 | | |

* cited by examiner

Section Line I-I

Section Line I-I

Figure 11:
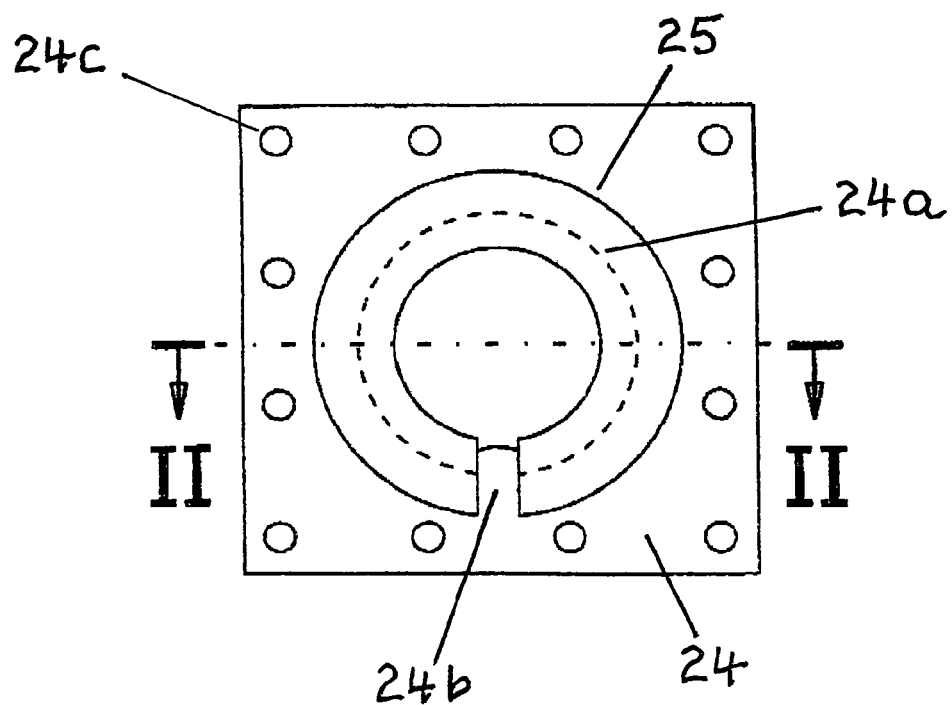

Section Line II-II
as shown in Fig. 11

Figure 12:
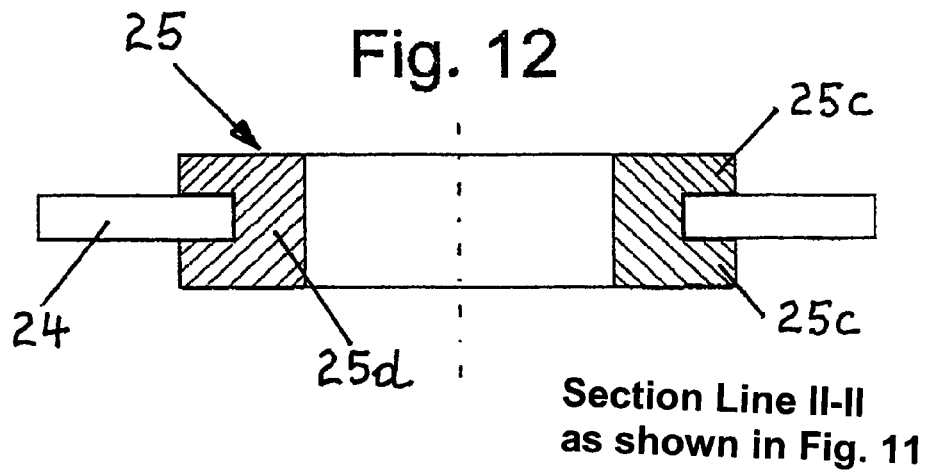

Mounting Ring in top-down view
as shown in Fig. 12

MOUNTING FRAME FOR SUPPORTING SHEET-TYPE SOLAR PANELS

RELATED APPLICATIONS

The present application claims priority under 35 U.S.C. 119 to German Utility Model Application No. 20 2007 007 970.2, filed Jun. 6, 2007, which is hereby incorporated by reference.

The invention relates to A mounting frame for supporting sheet-type solar panels comprising, fitted substantially vertically for anchoring by its lower end in the ground or by a fixed anchoring location, a supporting mast at which the solar panels resting on a plane panel support are supported by means of a supporting structure and which are rotatable about the axis of the mast for azimuthal tracking.

Such mounting frames are known in a wealth of different embodiments, additionally provided for tracking the angle of elevation of the solar panels, i.e. tracking the angle of the solar panels relative to the horizontal. In some known models the supporting structure is made up of supporting struts engaging the rear side of the panel support. On other known models the mounting frame mainly consists of just the vertically supporting mast itself engaging the rear side of the corresponding panel support roughly in the middle in supporting the same more or less at just one punctiform location. In these known designs too, using supporting struts, the points at which these stuts engage are located in the middle portion at the rear side of the panel support. The drawback of these prior art mounting frames and panel supports is that they are restricted in their wind and snow loading capacity.

A further drawback of the known mounting frames whose supporting structure is composed of supporting struts is that due to their relatively complicated design these supporting structures need to be welded together at least in part in production and thus make for bulky shipment. This is why the number of mounting frames which can be shipped in a shipping container or similar shipping means is relatively limited.

The object of the invention is to define a mounting frame of the aforementioned kind with a supporting structure for the panel support which withstands high wind and snow loads and which nevertheless, because of its relative simple structure, can now be shipped to the site fully dismantled.

This object is achieved in accordance with the invention by the aspects of the characterizing clause of the appended claim 1.

These features in accordance with the invention bring the advantage that because of the special configuration of the supporting structure the panel support can now be supported at the rear side to a plurality of portions or locations distributed over the full surface area, namely at its lower middle portion and at the two lower side portions thereof as well as at a plurality of locations at the upper rear portion of the panel support as is achieved by the supporting elements additionally provided in accordance with the invention between the upper portion and the central strut forming the hypotenuse of the supporting delta. This supporting delta consists of three central struts in accordance with the invention, secured at the upper mast end to a central supporting part ensures that wind or snow loads generated in the solar panels of the panel support can now be diverted symmetrically into the supporting structure in accordance with the invention, because the supporting delta is arranged symmetrically to the axis of the mast in a substantially horizontally plane and is supported at all of its delta points by supporting struts oriented downswept inclined to a supporting location at the lower end of the mast. It is in this way that the supporting delta secured to the central supporting part together with the supporting struts oriented inclined to the supporting location at the lower end of the mast forms a kind of substructure which symmetrically handles the loads generated by the panel support via struts and supporting elements respectively engaging the rear side of the panel support by directing them into the ground respectively into the fixed anchor location of the supporting mast, minimizing tilt moments of the mounting frame in excluding overloading thereof.

This is rendered all the more favorable by a cost-saving lightweight design of the mounting frame in accordance with the invention, because of which, and in view of its relatively simple design, a mounting frame in accordance with the invention can now be fully assembled on site, enabling it to be shipped totally dismantled. This now makes it possible to ship a much greater number of mounting frames in a shipping container or the like from the production location to the site than is possible with mounting frames needing to be shipped fully or at least partly assembled to the site.

To achieve with a mounting frame in accordance with the invention a fixed angle of elevation, the aspects as set forth in the appended claims 2-4 are particularly suitable for this purpose.

As compared to this, the aspects as set forth in the appended claims 5 and 6 can be used to achieve an adjustable angle of elevation of the solar panels resting on the panel support.

In this context the angle of elevation as set forth in claims 7 and 8 can be set both manually and servo powered. Both of these possibilities are likewise achievable with a mounting frame in accordance with the invention.

The appended claim 9 characterizes a further development of a known panel support contributing towards enhancing the stability as may find application e.g. in a mounting frame in accordance with the invention.

To achieve azimuthal tracking of the solar panels two possibilities exist with a mounting frame in accordance with the invention. One possibility is to anchor the supporting mast at its lower end axially rotatably as set forth in the aspects of the appended claims 10 and 11. In the other possibility in achieving azimuthal tracking of the solar panels the supporting mast is anchored non-rotatably at its lower end whilst as compared to this the supporting structure is rotatable with the central supporting part. This alternative is the basis of the aspects as set forth in the appended claims 12 and 13 which characterize for this purpose expedient and advantageous features.

For this second alternative additional supporting struts may be provided at the lower end of the mast for additional support of the supporting location as is claimed in the appended claim 14. In this second alternative the supporting location at the lower end of the mast can be engineered as a flanged plate as claimed in the appended claims 15 and 16.

The mounting ring as included in the claim 16 at the flanged plate can be non-rotatably held at the flanged plate by the aspects of the appended claim 17.

One advantageous embodiment of this mounting ring is claimed in claims 18 and 19.

The subject matter of claim 20 defines a quick and facilitated means of replacing the mounting ring by parting the two half-shells of the flanged plate.

A configuration of the central supporting part which is particularly suitable for a mounting frame in accordance with the invention is characterized in the claims 21 and 22 by the connecting flanges as provided for permitting quick and facilitated fastening of the struts of the supporting structure.

Whilst the appended claim 23 enumerates suitable materials for a supporting structure in accordance with the invention, as it reads from the appended claim 24 the parts of the supporting structure can be interconnected by bolted and/or welded connections. In this context it is especially the bolted connections that now make it possible to ship the mounting frame in accordance with the invention in a dismantled condition for quick and facilitated assembly on site. It is favorable for this possibility when—as claimed in the appended claim 25—all bolted connections bolts, nuts and any washers as needed are each provided the same in size.

Figure 1:
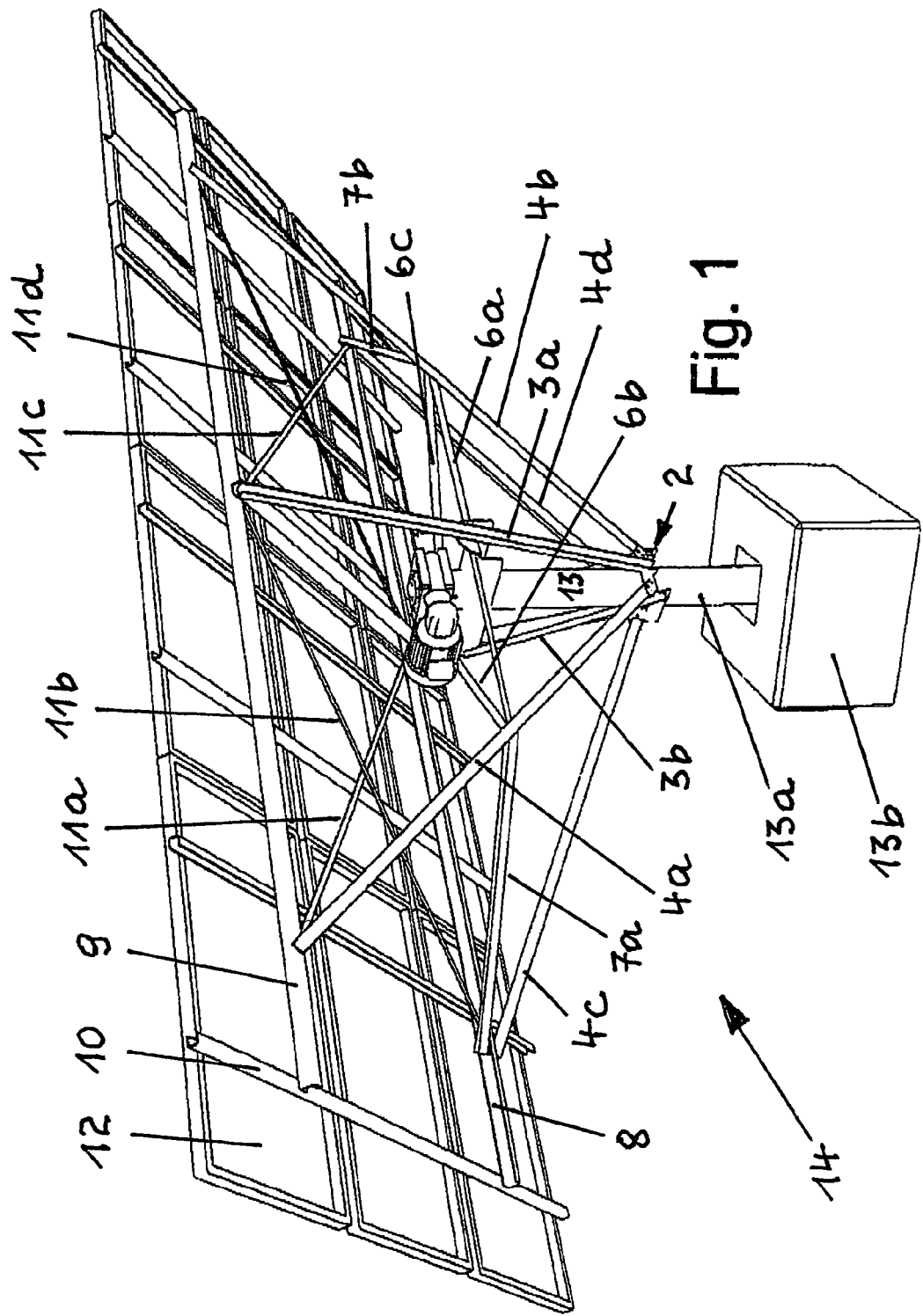
Figure 2:
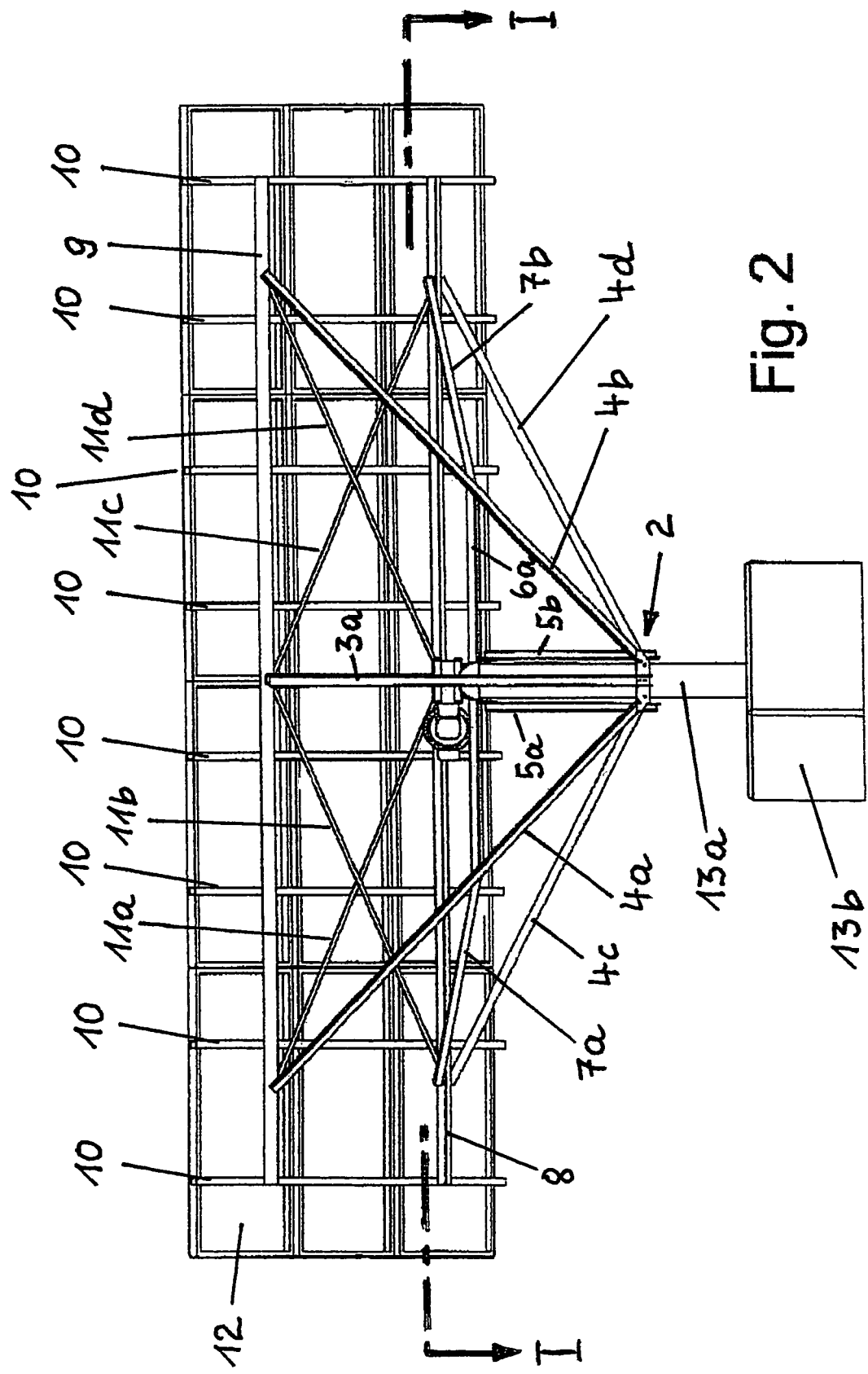
Figure 3:
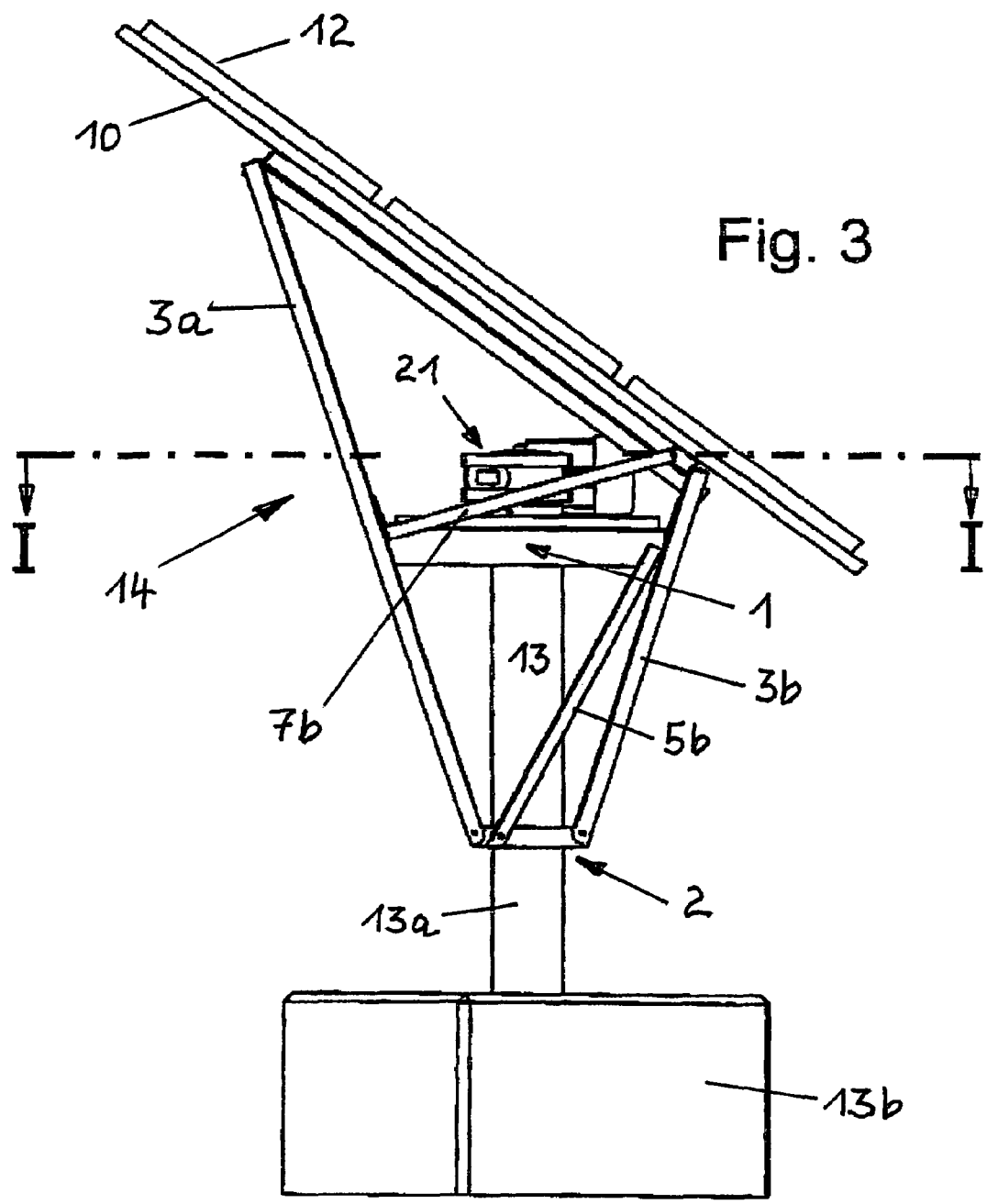
Figure 4:
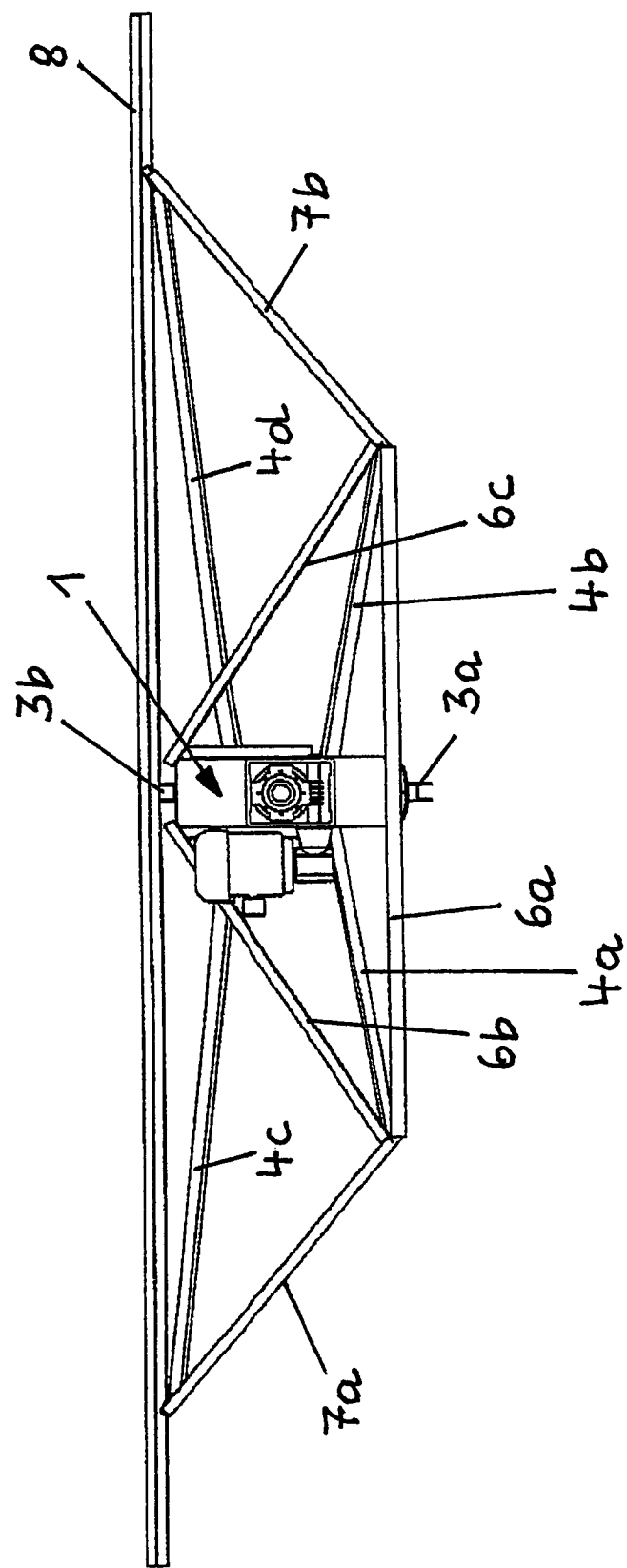
Figure 5:
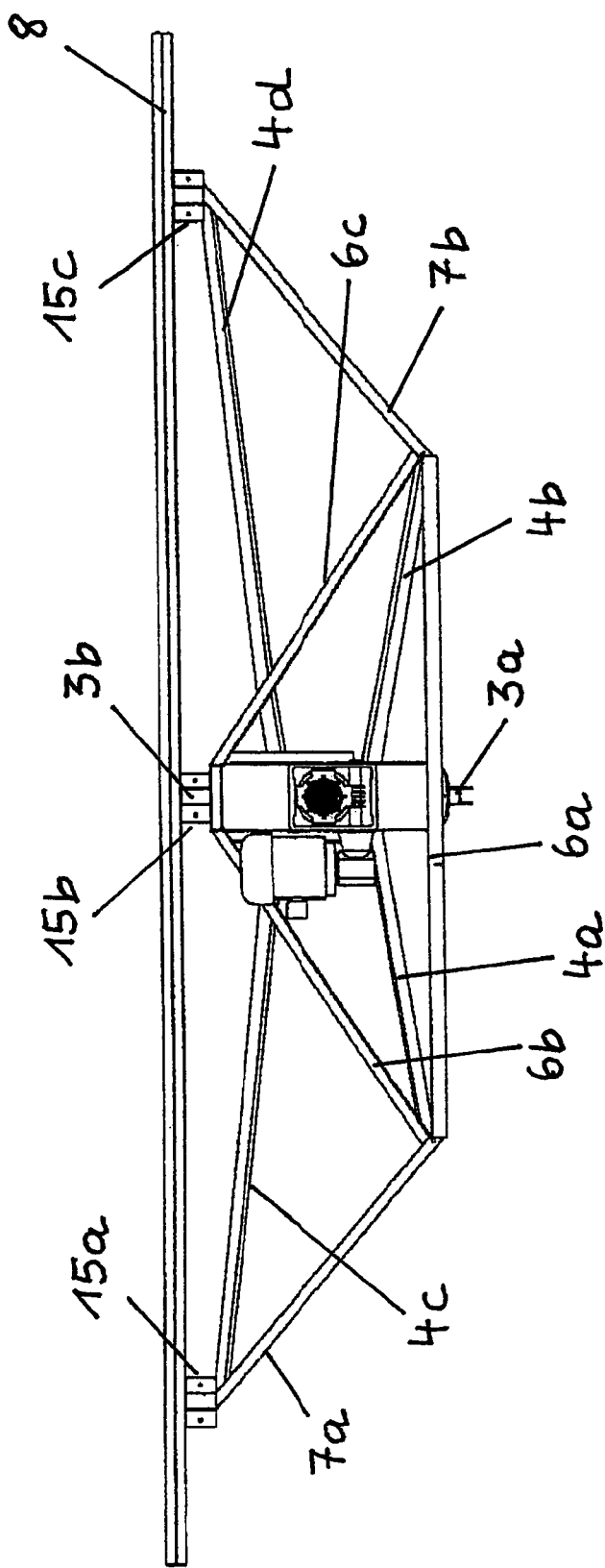
Figure 6:
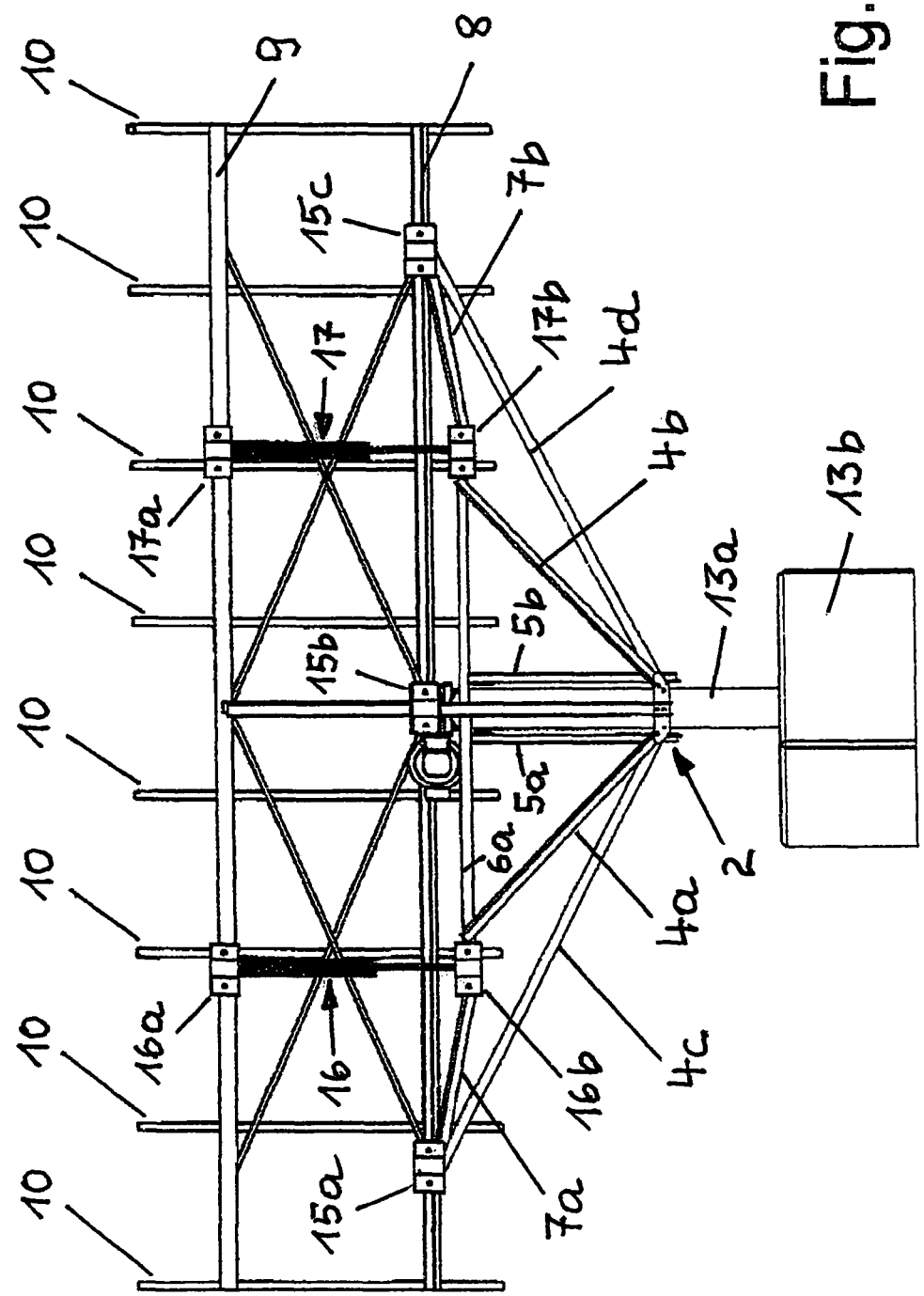
Figure 7:
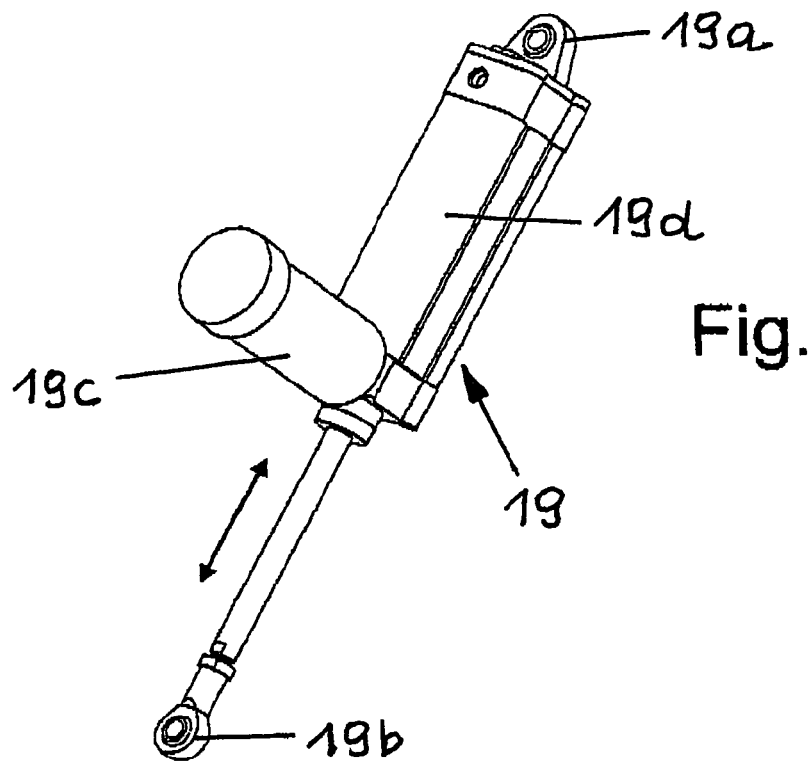
Figure 8:
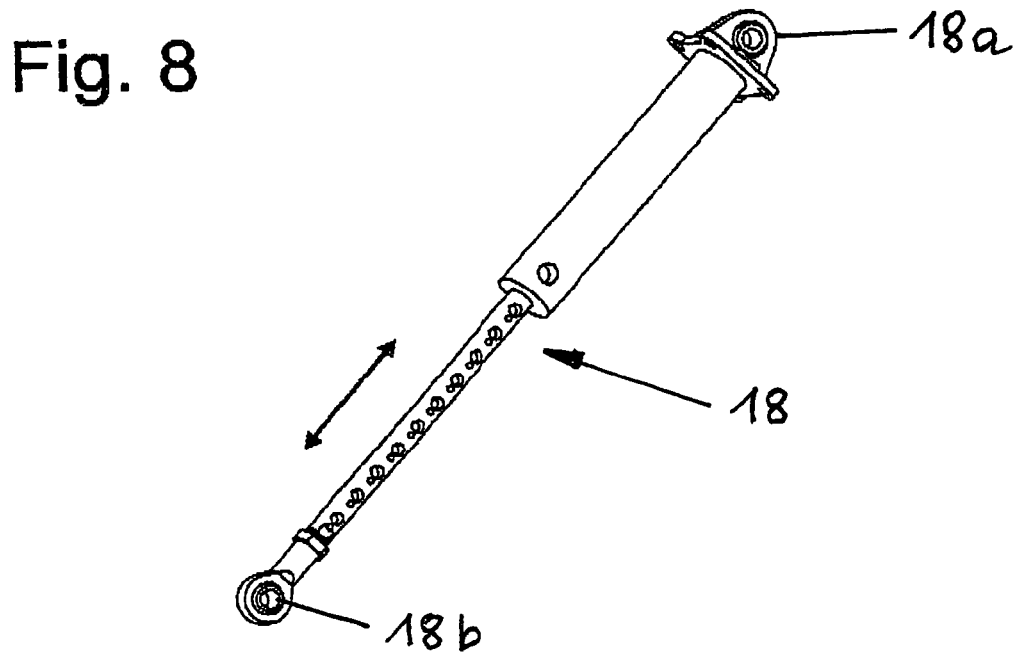
Figure 9:
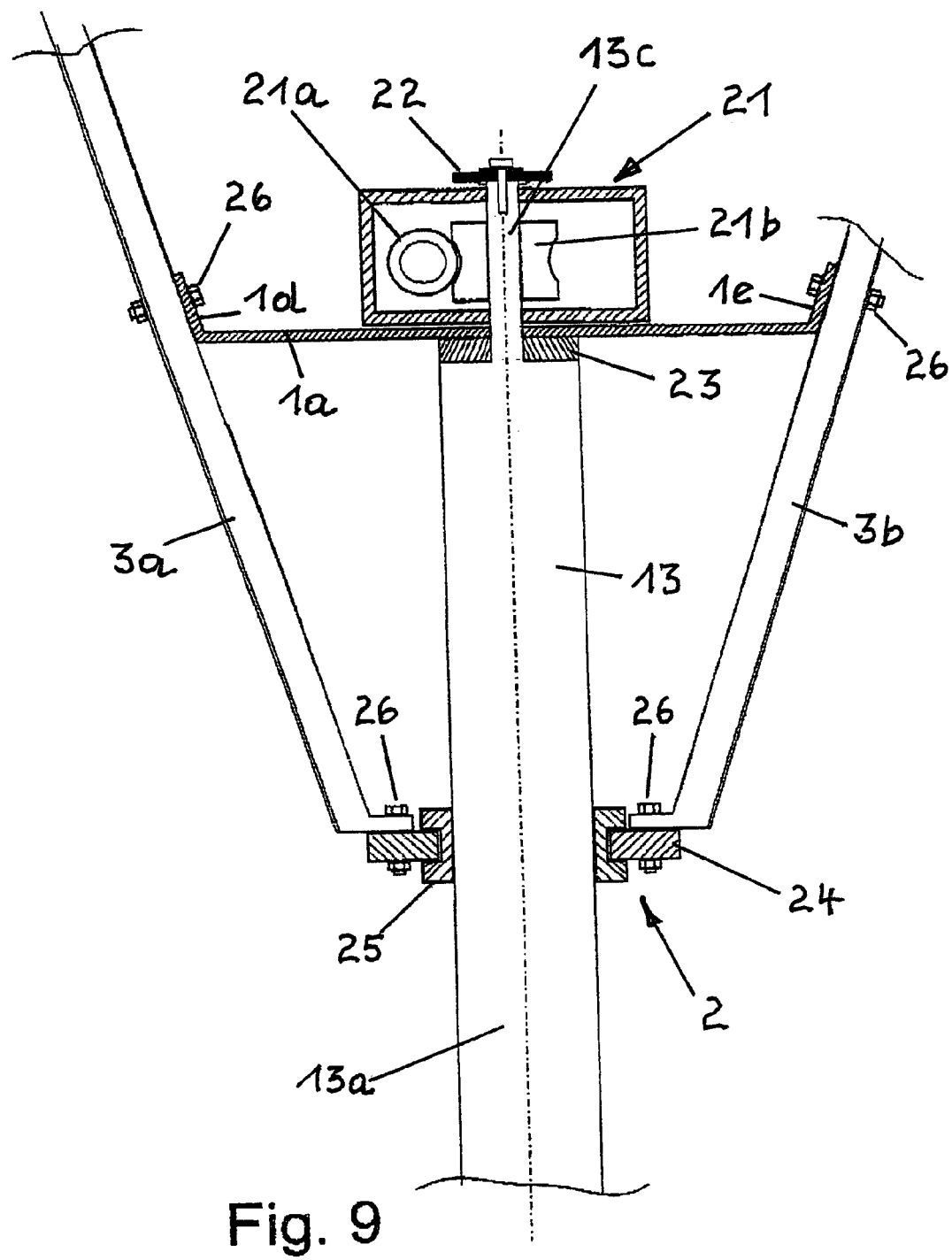
Figure 10:
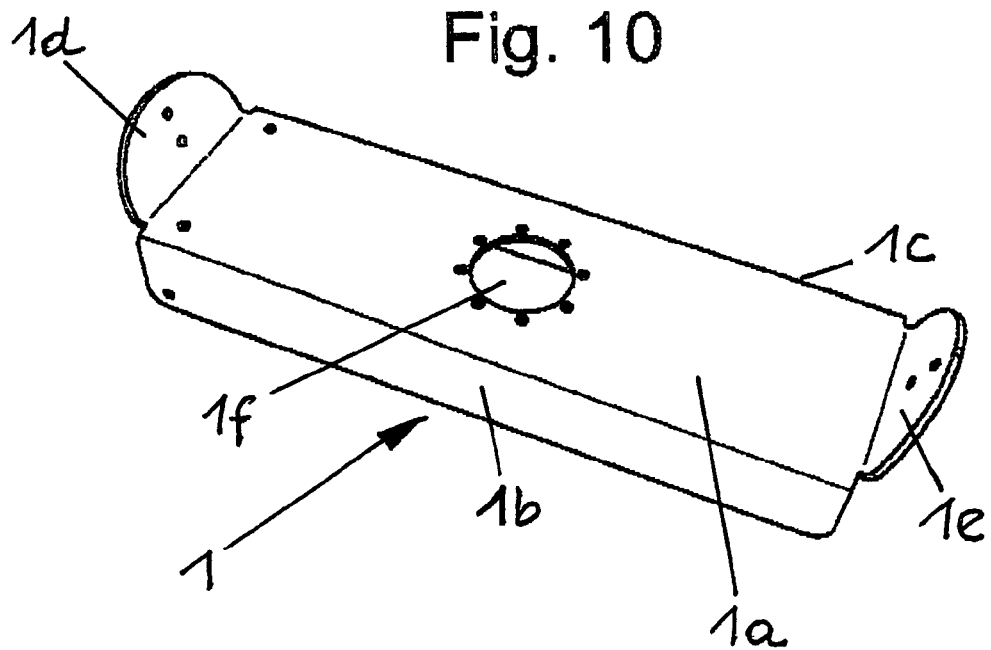
Figure 13:
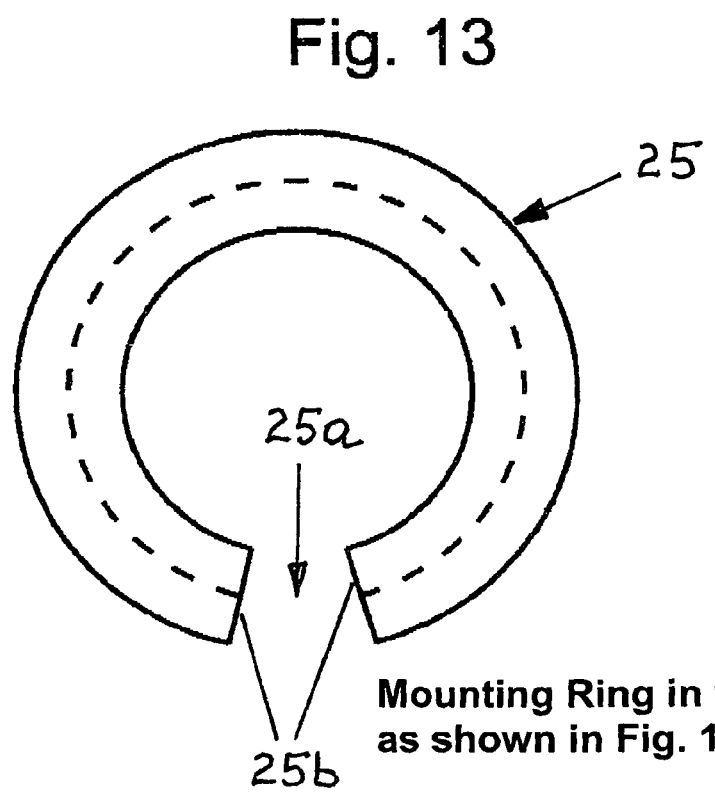
Figure 14:
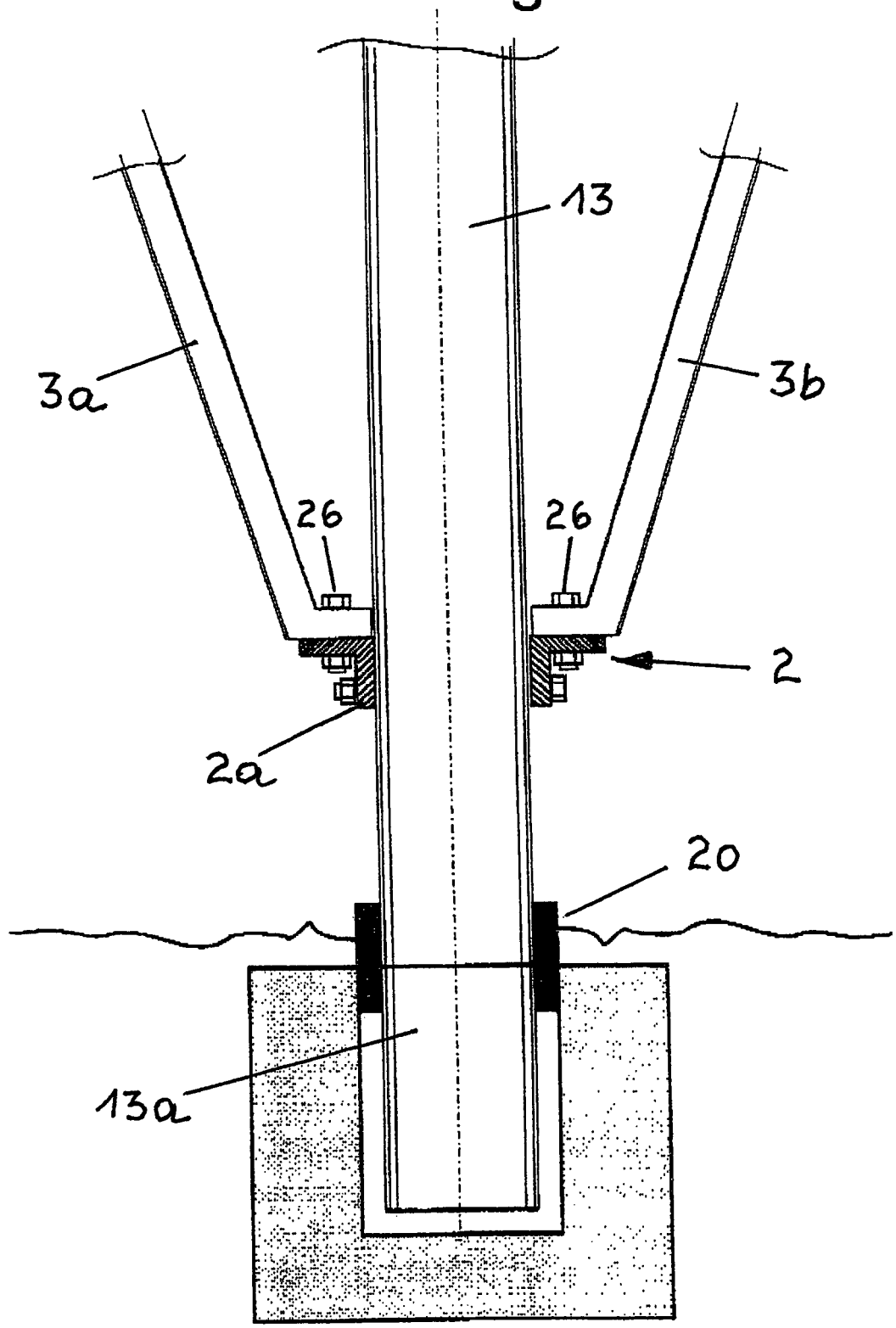

The invention will now be detailed by way of a plurality of example aspects with reference to the attached drawings showing diagrammatically and not to scale:

FIG. 1 as a rear view in perspective of a first embodiment of a mounting frame in accordance with the invention with a fixedly set angle of elevation, FIG. 2 as a view the same as in FIG. 1 but not in perspective, FIG. 3 as a side view of the first embodiment, FIG. 4 as a top-down view taken along the section line I-I as shown in FIGS. 2 and 3 respectively, FIG. 5 as an illustration corresponds to that of FIG. 4 of a second embodiment in which the angle of elevation is adjustable, FIG. 6 as a rear view of a second embodiment, FIG. 7 as a view of a servo powered telescopic extendable supporting element as may be used in the second embodiment as shown in FIG. 6, FIG. 8 as a view of a manually telescopic extendable supporting element as may be used in the second embodiment as shown in FIG. 6, FIG. 9 as an axial longitudinal section through a non-rotatably anchored supporting mast with a rotatable mounting frame and rotary drive for the corresponding azimuthal tracking, FIG. 10 as a view in perspective of the central supporting part used in accordance with the invention, FIG. 11 as a top-down view of the embodiment as shown in FIG. 9 for the lower supporting location of the supporting structure, FIG. 12 as a side view taken along the section line II-II in FIG. 11, FIG. 13 as a top-down view of the mounting ring as shown in the FIGS. 9, 11 and 12 and FIG. 14 as a view similar to that as shown in FIG. 9 in which the supporting mast is mounted rotatable.

Like parts are identified by like reference numerals in the drawings and the description of the FIGs. as follows.

Referring now to FIGS. 1-4 there is illustrated the mounting frame serving to support solar panels 12 resting on a panel support. This panel support comprises a lower transverse rail 8 and an upper transverse rail 9 which when in place extend mutually interspaced substantially horizontally over roughly the full width of the side portion. Both transverse rails 8 and 9 are secured to each other by a plurality of longitudinal rails 10 which when in place are equally interspaced in the direction of the longitudinal extension of the transverse rails 8 and 9. The panel support is reinforced by four additional reinforcement struts 11a-11d, two each of which reinforcement struts 11a and 11b respectively 11c and 11d are arranged crosswise to form in each case a reinforcement cross. These two reinforcing crosses when in place are located in the extension direction of the transverse rails 8 and 9 interspaced juxtaposed and can be secured by their four end points to the upper and lower transverse rail. The mounting frame comprises furthermore a substantially vertical supporting mast 13 non-rotatably anchored to a fixed anchoring location 13b at its lower end 13a. This supporting mast supports with the aid of a supporting structure, identified in all by the reference numeral 14 in FIG. 1, the aforementioned panel support resting the solar panels 12. The supporting structure 14 comprises at the upper end of the mast a central supporting part 1 for securing three central struts 6a-6c forming when in place a supporting delta in a plane located substantially perpendicular to the axis of the mast. The central strut 6a forming the hypotenuse of this supporting delta and oriented when in place substantially parallel to the transverse rails 8, 9 of the panel support can be secured substantially in the middle to the rear side of the central supporting part 1 facing away from the panel support 8. The two other substantially equal-length central struts 6b and 6c forming the sides of the supporting delta can be secured by their ends including the apex of the supporting delta to the front side of the central supporting part 1 facing the panel support. Between the two ends of the central strut 6a forming the hypotenuse of the supporting delta and a supporting location at the lower end 13a of the mast, identified in all by the reference numeral 2, a supporting strut 4a and 4b respectively is downswept inclined. Provided furthermore are two further supporting struts 3b and 3a extending between the front side respectively rear side of the central supporting part 1 and the supporting location 2 at the lower end 13a of the mast, the front supporting strut 3b being secured by its upper end to the middle portion of the lower transverse rail 8 of the panel support to thereby support this portion in this way. The two side end portions of the transverse rail 8 are supported by two additional struts 4c and 4d likewise secured in the corresponding end portions to the lower transverse rail 8 and extending downswept inclined to the supporting location 2 at the lower end 13a of the mast. Secured at both fastening locations of these additional struts 4a and 4d to the lower transverse rail 8 of the panel support are the ends of two retaining struts 7a and 7b respectively extending from each fastening location to the opposite end in the central strut 6a forming the hypotenuse of the supporting delta and which are fixedly connected to these ends. These two retaining struts form together with the struts of the supporting structure 14 joining the supporting location 2 at the lower end 13a of the mast and the three central struts forming the supporting delta and the central supporting part 1 a kind of supporting structure of the mounting frame as is particularly evident from the illustration as shown in FIG. 4. All of these struts are fixedly connected at their ends, i.e. either to each other or to the central supporting part 1 or to the mutual supporting location 2 at the lower end 13a of the mast.

Referring now to FIGS. 2 and 3 there is illustrated how for additional support of the supporting location 2 at the lower end 13a of the mast two retaining struts 5a and 5b located on both sides of the mast 13 between the central supporting part 1 and the supporting location 2 are provided, each end of which can be secured to the supporting part 1 and to the supporting location 2 respectively. These retaining struts 5a and 5b—omitted in FIGS. 1 and 4 so as not to clutter up the illustration—supplement the substructure in adding to its further stability.

For further support of the panel support the supporting structure 14 comprises a plurality of supporting elements provided oriented between the upper transverse rail 9 and the central strut 6a forming the hypotenuse of the supporting delta. In the case of the embodiment of a mounting frame in accordance with the invention as shown in FIGS. 1-4 these supporting elements have a fixed length and represent via the upright projecting straight elongations in the substantially horizontal plane of the supporting delta the three supporting struts 4a, 4b and 3b extending between central strut 6a forming the hypotenuse of the supporting delta and the supporting location 2 at the lower end 13a of the mast. These three elongations are fixedly connected by their ends to the upper transverse rail 9 of the panel support, supporting the latter by its two upper side portions and in the upper middle portion. It is in this way that the angle of elevation of the solar panels 12 is set fixed.

As evident from FIG. 10 in particular the central supporting part 1 comprises a substantially rectangular plate-type base plate 1a, at the four side edges of which connecting flanges 1b-1e engineered integrally with the base plate 1a and inclined to the plane of the plate are featured, serving to secure the struts of the supporting structure. Since as shown in all FIGs. all fixed connections at the supporting structure 14 are achieved by bolted connections 26 with bolts, nuts and any washers as needed the same in size, the central supporting part 1—again as shown in FIG. 10—features corresponding tappings for these bolted connections.

To achieve an adjustable angle of elevation of the solar panels 12 in accordance with the embodiment as shown in FIGS. 5 and 6 the struts of the supporting structure 14 engaging the lower transverse rail 8 of the panel support are pivotally mounted at 15a, 15b and 15c at this transverse rail. Provided furthermore as evident from FIG. 6 are two telescopically extendable supporting elements 16 and 17 which are pivot mounted by their one end 16b and 17b respectively at both ends of the central strut 6a forming the hypotenuse of the supporting delta. The other ends 16a and 17a respectively of these two supporting elements 16 and 17 are hinged to the upper transverse railing 9 of the panel support such that each supporting element is moveable when in place and when setting the angle of elevation in a substantially vertical plane parallel to the axis of the mast.

As shown in FIG. 7 each of the two supporting elements 16 and 17 comprises a module 19 each comprising a servo motor 19c and a tubular telescoping assembly 19d cooperating with the servo motor by which it is extensible, enabling the angle of elevation to be set powered. Pivotal mounting flanges 19a and 19b serve pivoting at the transverse rail 9 and central strut 6a respectively.

Contrary to this, it is, however, just as possible to set the angle of elevation manually by—as shown in FIG. 8—each supporting element 16 and 17 being engineered as a manually telescopically extensible and arrestable supporting strut 18. The arresting is achieved by bolts (not shown) passing through corresponding flush tappings in both parts of the supporting trut. The corresponding pivotal mounting flanges are identified by reference numerals 18a and 18b.

To achieve azimuthal tracking of the solar panels 12 the central supporting part 1 is mounted at the upper mast end and the supporting location 2 at the lower end 13a of the mast axially freely rotatable at the non-rotatably anchored supporting mast 13. For this purpose the central supporting part 1 comprises a center hole 1f (FIG. 10) and, as evident from FIG. 9, by means of this tapping is push-mounted on a trunnion 13c forming the upper mast end. The rotation mount for the pushed-on central supporting part 1 forms, as shown in FIG. 9, a plastics ring 23 which is likewise penetrated by the trunnion 13c and is seated on a radial boss between the trunnion 13c and the outer circumference of the supporting mast 13. Non-rotatably anchored at the trunnion 13c furthermore is a gear wheel 21b which mates with the drive worm 21a of a worm drive identified in all in FIG. 9 by the reference numeral 21. This worm drive is fixedly connected to the central supporting part 1 so that a rotational motion about the gear wheel 21b is executed on rotation of the drive worm 21a of this worm drive together with the central supporting part 1 fixedly connected thereto. It is in this way that the solar panels 12 supported by the supporting structure 14 are azimuthally tracked. A retaining flange 22 applied to the upper end of the trunnion 13c prevents the worm drive 21 from lifting off from the plastics ring 23 forming the rotational mount of this supporting part.

As further evident from FIG. 9 in conjunction with FIGS. 11-13 the supporting location 2 mounted rotatable relative to the supporting mast 13 is engineered as a flanged plate 24 with a center hole 24a receiving the lower end 13a of the mast, surrounding it circumferentially with a radial spacing. This free spacing is filled out by a mounting ring 25 of slippery plastics material pushed on the edge of the center hole 24a and serving as a rotational mount for the flanged plate 24. For this purpose the mounting ring 25 has a U-shaped cross-section with an inner width between the two legs 25c of the mounting ring 25 substantially corresponding to the thickness of the flanged plate 24. The opening defined by free leg ends is located at the outer circumference of the ring so that when the mounting ring 25 is pivotally mounted its two legs extend on both sides of the side edges of the center hole 24a whilst the yoke part 25d (FIG. 12) connecting the lower leg ends fill out the space between the inner edge of the center hole 24a and the outer circumference of the supporting mast 13.

So that on rotation of the flanged plate 24 the mounting ring 25 is slaved in the motion, jutting inwards from the inner edge of the center hole 24a substantially in the radial direction there is a nose 24b located in the plane of the flanged plate 24. The radial length of this nose is dimensioned to equal, at the most, the radial spacing between the outer circumference of the mast and inner edge of the center hole 24a. Because of this nose 24b the material of the mounting ring 25 is machined away segmentally at 25a (FIG. 13) over a circumferential length which as viewed in the circumferential direction substantially corresponds to the width of the protruding nose 24b. It is in this way that the mounting ring 25 push-mounted on the edge of the hole is held non-rotatably by the faces 25b of the mounting ring 25 defining the machined away segment contacting the side edges of this nose.

As evident further from FIGS. 9 and 11 the edge portions of the flanged plate 24 jutting from the outer circumference of the supporting mast 13 comprise tappings 24c which serve to secure the downswept struts of the supporting structure 14 by means of the bolted fasteners at the flanged plate 24.

Should the mounting ring 25 need replacing, quick and facilitated replacement is preferably assured when the flanged plate 24 is configured split and comprising two intersecurable half-shells (not shown) for mounting on the outer circumference of the supporting mast 13 and which can be fixedly interconnected.

Whilst in the embodiment as described thus far, the supporting mast 13 is held non-rotatably and is turned together with the central supporting part 1 and the supporting location 2 at the lower end 13a of the mast relative to the supporting structure 14 for azimuthal tracking, it may also be provided for alternatively that the supporting mast 13 itself is rotationally mount. In this case to achieve azimuthal tracking the supporting structure 14 with the central supporting part 1 and the supporting location 2 are to be non-rotatably connected to the supporting mast. For the lower supporting location 2 this arrangement is illustrated diagrammatically in FIG. 14 in which the lower end 13a of the mast is rotatively supported in a rotary mount 20. In this case the supporting location 2 is likewise configured as a flanged plate which however, unlike the other embodiments as described above, is in this case fixedly secured to the supporting mast via an axial collar 2a and a bolted fastener. In this case too, the down-swept struts of the supporting structure 14 are bolted to the flanged plate forming the supporting location 2 by corresponding bolted fasteners 26.

It is to be noted in conclusion that galvanized iron, hard aluminum and/or stainless steel can be used as the material for the supporting structure 14, although it is just as possible that other suitable materials may also be employed.

The invention claimed is:

1. A mounting frame for supporting sheet-type solar panels comprising:
    a supporting mast fitted substantially vertically for anchoring by its lower end in the ground or by a fixed anchoring location;
    a supporting structure coupled to the supporting mast and supporting the solar panels resting on a plane panel support, the supporting structure rotatable about an axis of the mast for azimuthal tracking, the supporting structure including at the upper end of the mast a central supporting base plate securing three central struts forming a supporting delta permanently positioned in a plane substantially perpendicular to the axis of the mast, wherein one of the central struts forms the hypotenuse of this supporting delta and is oriented substantially parallel to the plane of the panel support, the one central strut being directly secured substantially in the middle of the rear side of the central supporting base plate facing away from the panel support, wherein the two other central struts are substantially equal in length and form sides of the supporting delta, the two other central struts being directly secured by their ends to the front side of the central supporting base plate facing the panel support;
    two first inclined supporting struts disposed between an upper rear portion of the plane panel support and a supporting location at the lower end of the mast and in contact with at least one of the central struts therebetween;
    second front and rear inclined supporting struts extending between the plane panel support and the supporting location and in contact with the central supporting base plate therebetween, the second front inclined supporting strut supporting the lower middle rear portion of the panel support and the second rear inclined support supporting the upper middle rear portion of the plane panel support,
    wherein two lower side portions of the plane panel support are further supported at the rear side of the panel support by third inclined struts extending from these two portions to the supporting location; and
    retaining struts, each retaining strut oriented between the associated side portion at the rear side of the panel support and an end of the one central strut; and
    a plurality of supporting struts configured to support the panel support, the supporting struts disposed between the upper rear portion of the panel support and the one central strut, wherein, to achieve a fixed set angle of elevation of the solar panels resting on the panel support, the supporting struts have a fixed length and are fixedly connectable by their one end to the one central strut and by their other end to the upper rear portion of the panel support.

2. The mounting frame as set forth in claim 1, wherein the supporting struts of the supporting structure engaging the two lower side portions and the lower middle portion of the panel support are fixedly connectable to the panel support.

3. The mounting frame as set forth in claim 1, wherein the fixed length supporting elements are the three supporting struts which in the substantially horizontal plane of the supporting delta via the upright projecting straight elongations extend between the central struts forming the hypotenuse of the supporting delta and the supporting location at the lower end of the mast.

4. The mounting frame as set forth in claim 1, wherein the panel support comprises an upper transverse rail and a lower transverse rail mutually interspaced and extending substantially horizontally over substantially the full width of the solar panel and to which the struts and supporting elements of the supporting structure are connectable, the transverse rails being securable to each other by a plurality of longitudinal rails located in line in the direction of the longitudinal extension of the panel support, wherein the panel support is reinforceable by four additional reinforcement struts, wherein two of the reinforcement struts are arrangeable to form a reinforcing cross, the two reinforcing crosses when in place being located in the extension direction of the panel support and are securable by their four end points to the upper and lower transverse strut.

5. The mounting frame as set forth in claim 1, wherein, to achieve azimuthal tracking of the solar panels, the supporting mast is anchorable non-rotatably at its lower end, the central supporting base plate is mountable at the upper mast end, and the supporting location is mountable at the lower end of the mast axially freely rotatable at the supporting mast.

6. The mounting frame as set forth in claim 5, wherein a worm drive is provided for driving azimuthal tracking of the solar panels, the worm drive is fixedly connectable to the central supporting base plate, the drive worm mates with a rim gear of a gear wheel anchorable non-rotatably axially at the upper end of the supporting mast.

7. The mounting frame as set forth in claim 5, wherein, for additional support of the supporting location at the lower end of the mast, two retaining struts are located on both sides of the supporting mast between the central supporting base plate and the supporting location, each end of which is securable to the central supporting base plate and to the supporting location respectively.

8. The mounting frame as set forth in claim 5, wherein the supporting location includes a flanged plate with a center hole configured to receive the lower end of the mast with the flanged plate remaining freely rotatable, the lower ends merging at the flanged plate and securable to the edge portions of the flanged plate protruding from the outer circumference of the supporting mast.

9. The mounting frame as set forth in claim 8, wherein the center hole of the flanged plate surrounds the supporting mast circumferentially with a radial spacing which is fillable by a mounting ring push-mounted at the edge of the center hole and serving as a rotation mount for the flanged plate.

10. The mounting frame as set forth in claim 9, comprising a nose jutting inwards from the inner edge of the center hole substantially in the radial direction located in the plane of the flanged plate, the radial length of the nose less than or equal to the radial spacing between the outer circumference of the mast and inner edge of the center hole, the mounting ring including a gap corresponding to the width of the nose, wherein the mounting ring is non-rotatably restrained by the nose.

11. The mounting frame as set forth in claim 9, wherein the mounting ring has a U-shaped cross-section with an inner width between the two legs of the mounting ring substantially corresponding to the thickness of the flanged plate, wherein the opening defined by the free leg ends is located at the outer circumference of the ring, wherein, when the mounting ring is pivotally mounted, its two legs extend on both sides of the side edges of the center hole, wherein the yoke part connecting the lower leg ends fills out the space between the inner edge of the center hole and the outer circumference of the supporting mast.

12. The mounting frame as set forth in claim 9, wherein the mounting ring is made of an elastic polymeric material.

13. The mounting frame as set forth in claim 8, wherein the flanged plate is made up of two intersecurable half-shells for mounting on the outer circumference of the supporting mast.

14. The mounting frame as set forth in claim 1, wherein the central supporting base plate is configured to mount at the upper end of the supporting mast, the base plate comprising connecting flanges configured to secure the struts of the supporting structure, the connecting flanges integrally formed with the base plate and inclined to the plane of the plate.

15. The mounting frame as set forth in claim 14, comprising a substantially rectangular base plate including an inclined connecting flange at each side edge of the base plate.

16. The mounting frame as set forth in claim 1, wherein the supporting structure is formed from one of galvanized iron, hard aluminum or stainless steel.

17. The mounting frame as set forth in claim 1, comprising a supporting structure held together by bolted or welded connections.

18. The mounting frame as set forth in claim 17, wherein the bolted connections include bolts, nuts, and washers.

* * * * *